(12) United States Patent
Negishi

(10) Patent No.: US 12,311,541 B2
(45) Date of Patent: May 27, 2025

(54) GENERATION METHOD, COMPUTER PROGRAM, AND GENERATION SYSTEM

(71) Applicant: SEIKO EPSON CORPORATION, Tokyo (JP)

(72) Inventor: Shun Negishi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 232 days.

(21) Appl. No.: 18/162,808

(22) Filed: Feb. 1, 2023

(65) Prior Publication Data
US 2023/0241763 A1 Aug. 3, 2023

(30) Foreign Application Priority Data

Feb. 2, 2022 (JP) .................................. 2022-014856

(51) Int. Cl.
*B25J 9/16* (2006.01)
*B25J 9/00* (2006.01)
(52) U.S. Cl.
CPC ........... *B25J 9/0081* (2013.01); *B25J 9/1664* (2013.01); *B25J 9/1689* (2013.01)
(58) Field of Classification Search
CPC ...... B25J 9/1664; B25J 9/1689; B25J 9/1602; B25J 19/023; B25J 9/0081; G05B 2219/36442; G05B 2219/39546; G05B 2219/40116; G05B 19/427
See application file for complete search history.

(56) References Cited

U.S. PATENT DOCUMENTS

| | | | |
|---|---|---|---|
| 2016/0059412 A1* | 3/2016 | Oleynik .................. | B25J 19/02 700/250 |
| 2018/0200890 A1* | 7/2018 | Oumi ...................... | B25J 9/1671 |
| 2018/0243897 A1* | 8/2018 | Hashimoto .............. | B25J 13/02 |
| 2019/0321983 A1 | 10/2019 | Chen et al. | |
| 2020/0039082 A1* | 2/2020 | Kapoor .................... | B25J 13/06 |
| 2022/0410395 A1* | 12/2022 | Sugaya ................... | B25J 9/1605 |
| 2023/0234218 A1* | 7/2023 | Hoshiyama ............ | B25J 9/0081 700/264 |

FOREIGN PATENT DOCUMENTS

JP 2019-188477 A 10/2019

* cited by examiner

*Primary Examiner* — Adam R Mott
*Assistant Examiner* — Sagar Kc
(74) *Attorney, Agent, or Firm* — Harness, Dickey & Pierce, P.L.C.

(57) ABSTRACT

A generation method of generating a motion control program for a robot includes displaying a plurality of parameters relating to a motion of a human, receiving a selection of an imitation parameter as the parameter to be imitated by the robot from the displayed plurality of parameters, and generating the motion control program with reference to the motion of the human corresponding to the received imitation parameter.

7 Claims, 18 Drawing Sheets

FIG. 3

| PARAMETER | DEFINED DETAILS |
|---|---|
| MOVEMENT TRAJECTORY | SHORTEST TRAJECTORY |
| WORKPIECE POSITION | CORRESPONDING TO TRAJECTORY |
| WORKPIECE GRIPPING POSITION | PREDETERMINED POSITION OF WORKPIECE |
| FORCE TO WORKPIECE | INITIAL VALUE |
| MOVEMENT SPEED | HIGHEST VALUE |
| PRELIMINARY MOTION | NOT PERFORMED |

FIG. 4

| PARAMETER | DEFINED DETAILS |
|---|---|
| MOVEMENT TRAJECTORY | SPECIFIED MOVEMENT TRAJECTORY |
| WORKPIECE POSITION | SPECIFIED POSITION |
| WORKPIECE GRIPPING POSITION | SPECIFIED POSITION |
| FORCE TO WORKPIECE | SPECIFIED MAGNITUDE OF FORCE |
| MOVEMENT SPEED | SPECIFIED MOVEMENT SPEED |
| PRELIMINARY MOTION | SPECIFIED PRELIMINARY MOTION |

FIG. 7

PLEASE SELECT PARAMETER TO BE BASED ON HUMAN MOTION

| IM1 | | | IM0 | | IM2 |
|---|---|---|---|---|---|
| MOVEMENT TRAJECTORY | YES | NO | FORCE TO WORKPIECE | YES | NO |
| WORKPIECE POSITION | YES | NO | MOVEMENT SPEED | YES | NO |
| WORKPIECE GRIPPING POSITION | YES | NO | PRELIMINARY MOTION | YES | NO |

ENTER (IM3)    SET (IM4)

GENERATION METHOD, COMPUTER PROGRAM, AND GENERATION SYSTEM

The present application is based on, and claims priority from JP Application Serial Number 2022-014856, filed Feb. 2, 2022, the disclosure of which is hereby incorporated by reference herein in its entirety.

BACKGROUND

1. Technical Field

The present disclosure relates to a technique of generating a motion control program for a robot.

2. Related Art

In related art, a technique of generating a motion control program for controlling a motion of a robot by controlling the robot to imitate real work by a human is known (JP-A-2019-188477).

In the related art, when the motion control program is generated by controlling the robot to uniformly imitate all motions as the real work by the human, generation of a motion control program for realizing a desired motion of the robot may be hard. For example, depending on the location where the robot is used, the details of work, the shape of a workpiece as an object of work, or the like, when the robot is controlled to uniformly imitate all motions of the motion of the human, the motions by the robot may be unsuitable for the work situation on the workpiece.

SUMMARY

According to a first aspect of the present disclosure, a generation method of generating a motion control program for a robot is provided. The generation method includes displaying a plurality of parameters relating to a motion of a human, receiving a selection of an imitation parameter as the parameter to be imitated by the robot from the displayed plurality of parameters, and generating the motion control program with reference to the motion of the human corresponding to the received imitation parameter.

According to a second aspect of the present disclosure, a non-transitory computer-readable storage medium storing a computer program for controlling a processor to execute generation of a motion control program for a robot is provided. The computer program is for controlling the processor to execute a function of displaying a plurality of parameters relating to a motion of a human on a display apparatus, a function of receiving a selection of an imitation parameter as the parameter to be imitated by the robot from the displayed plurality of parameters, and a function of generating the motion control program with reference to the motion of the human corresponding to the received imitation parameter.

According to a third aspect of the present disclosure, a generation system of generating a motion control program for a robot is provided. The generation system includes a display control unit displaying a plurality of parameters relating to a motion of a human on a display apparatus, a reception unit receiving a selection of an imitation parameter as the parameter to be imitated by the robot from the displayed plurality of parameters, and a program generation unit generating the motion control program with reference to the motion of the human corresponding to the received imitation parameter.

BRIEF DESCRIPTION OF THE DRAWINGS

FIG. 3 is a diagram for explanation of parameter initial information.

FIG. 4 is a diagram for explanation of human motion information.

FIG. 7 is a diagram for explanation of the generation processing of the motion control program.

DESCRIPTION OF EXEMPLARY EMBODIMENTS

A. Embodiment

Figure 1:
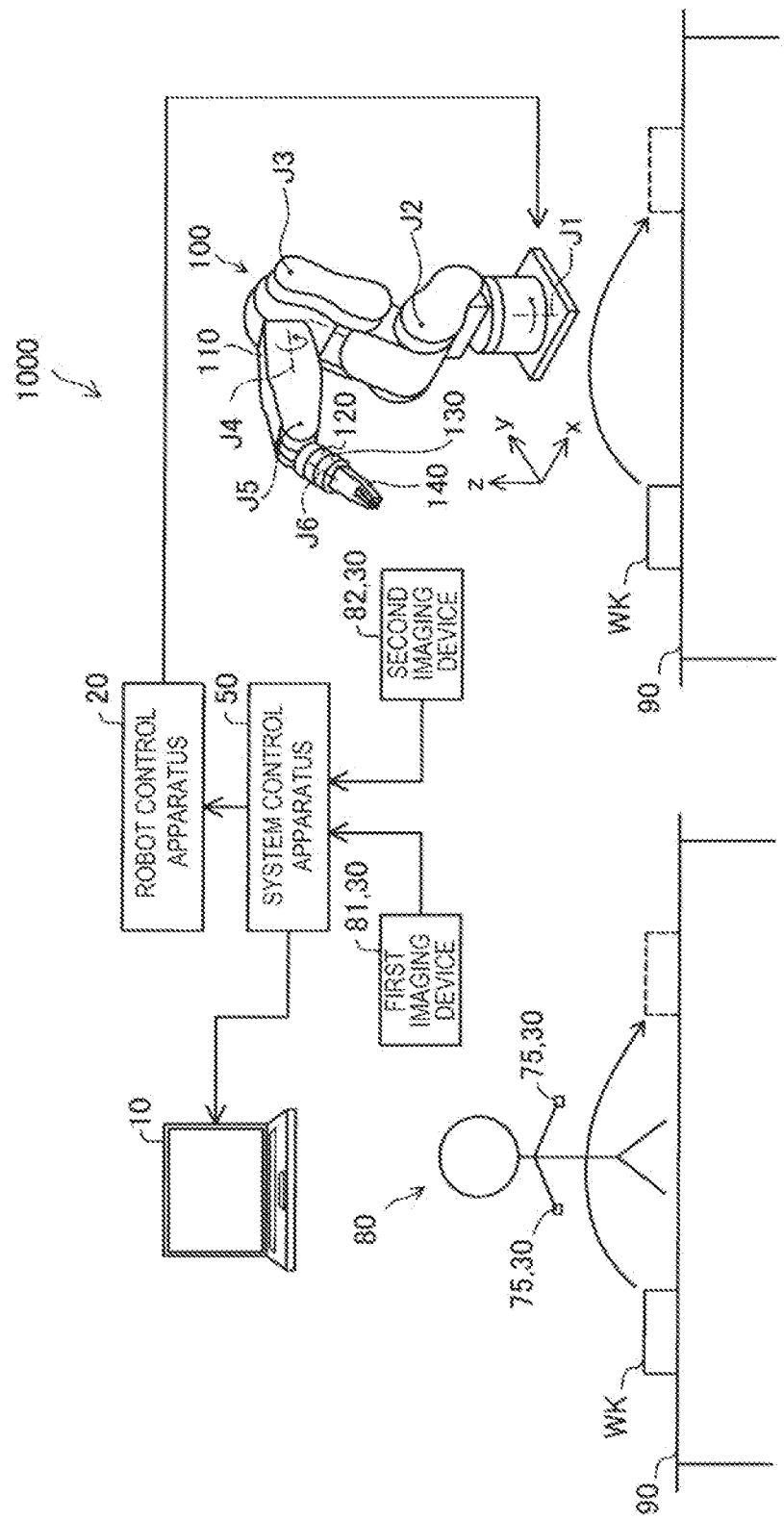
FIG. 1 is an overall configuration diagram showing a generation system of an embodiment.

FIG. 1 is an overall configuration diagram showing a generation system 1000 of an embodiment. The generation system 1000 is a system of generating a motion control program for a robot 100 with reference to a motion of a human 80 when motion teaching to the robot 100 is performed. In the embodiment, an example of generating the motion control program for the robot 100 with reference to a motion of the human 80 to move a workpiece WK on a working bench 90 from a first position to a second position is explained. The generation system 1000 includes a display apparatus 10, a robot control apparatus 20, a system control apparatus 50, sensors 30, and the robot 100.

The robot 100 in the embodiment is a single-arm robot used with various end effectors 140 attached to an arm flange 120 at the distal end of an arm 110.

The arm 110 has six joints J1 to J6. The joints J2, J3, J5 are bending joints and the joints J1, J4, J6 are twisting joints. In each joint, a servo motor and a position sensor are provided. The servo motor generates rotation output for driving each joint. The position sensor 160 detects an angular position of the output shaft of the servo motor. Note that, to facilitate understanding of the technique, the servo motors and the position sensors are not shown in FIG. 1.

Various end effectors 140 for work of gripping, processing, or the like on an object are attached to the arm flange 120 at the distal end of the joint J6. In this specification, an object handled by the robot 100 is also referred to as "workpiece".

The position near the distal end of the arm 110 can be set as a tool center point. Hereinafter, the tool center point is referred to as "TCP". The TCP is a position used as a reference for the position of the end effector 140. For example, a predetermined position on the rotation axis of the joint J6 may be set as the TCP.

The robot 100 may place the end effector 140 in an arbitrary position and an arbitrary attitude within the movable range of the arm 110. In the arm flange 120, a force detector 130 and the end effector 140 are placed. The end effector 140 is a gripper in the embodiment. The end effector 140 may hold the workpiece WK.

The force detector 130 is provided in the robot 100 and may measure an external force applied to the robot 100. Specifically, the force detector 130 is a six-axis sensor. The force detector 130 may detect magnitude of forces parallel to an x-axis, a y-axis, and a z-axis orthogonal to one another in a sensor coordinate system as an intrinsic coordinate system and magnitude of torque around the three axes.

A coordinate system defining the space in which the robot 100 is installed is referred to as "robot coordinate system". The robot coordinate system is a three-dimensional orthogonal coordinate system defined by the x-axis and the y-axis orthogonal to each other on a horizontal plane and the z-axis in a positive direction along the vertical upward direction. The coordinate system shown in FIG. 1 is the robot coordinate system. An arbitrary position in the three-dimensional space may be expressed by positions in the x-, y-, z-axis directions and an arbitrary attitude in the three-dimensional space may be expressed by rotation angles around the x-, y-, z-axes. In this specification, "position" may refer to both a position and an attitude. Further, in this specification, "force" may refer to both a force and torque.

The display apparatus 10 displays various kinds of information including characters and images. The display apparatus 10 is e.g., a liquid crystal monitor. In the embodiment, the display apparatus 10 is a monitor of a personal computer.

The sensors 30 include a first imaging device 81, a second imaging device 82, and a pressure sensor 75. The sensors 30 and the system control apparatus 50 are coupled by wired or wireless connection and data may be transmitted from the sensors 30 to the system control apparatus 50. The first imaging device 81 includes an image sensor acquiring a motion of the human 80 when the human 80 performs work on the workpiece WK as time-sequential images, and a depth sensor detecting distances to objects including the human 80 and the workpiece WK and three-dimensional shapes of the objects. The second imaging device 82 includes an image sensor acquiring a motion of the robot 100 when the robot 100 performs work on the workpiece WK as time-sequential images, and a depth sensor detecting distances to objects including the robot 100 and the workpiece WK and three-dimensional shapes of the objects. The data respectively acquired and detected by the first imaging device 81 and the second imaging device 82 is transmitted to the system control apparatus 50. The pressure sensor 75 is attached to e.g., a hand of the human 80 and detects magnitude of a force for gripping the workpiece WK by the human 80.

The robot control apparatus 20 controls the arm 110 and the end effector 140 by transmitting a control command to the robot 100. The system control apparatus 50 generates the motion control program for the robot 100 based on the data from the sensors 30 and received reference parameters, which will be described later. The generated motion control program is transmitted to the robot control apparatus 20 and stored in a memory of the robot control apparatus 20. Note that the robot control apparatus 20 and the system control apparatus 50 may be provided as a single apparatus or separate apparatuses.

Figure 2:
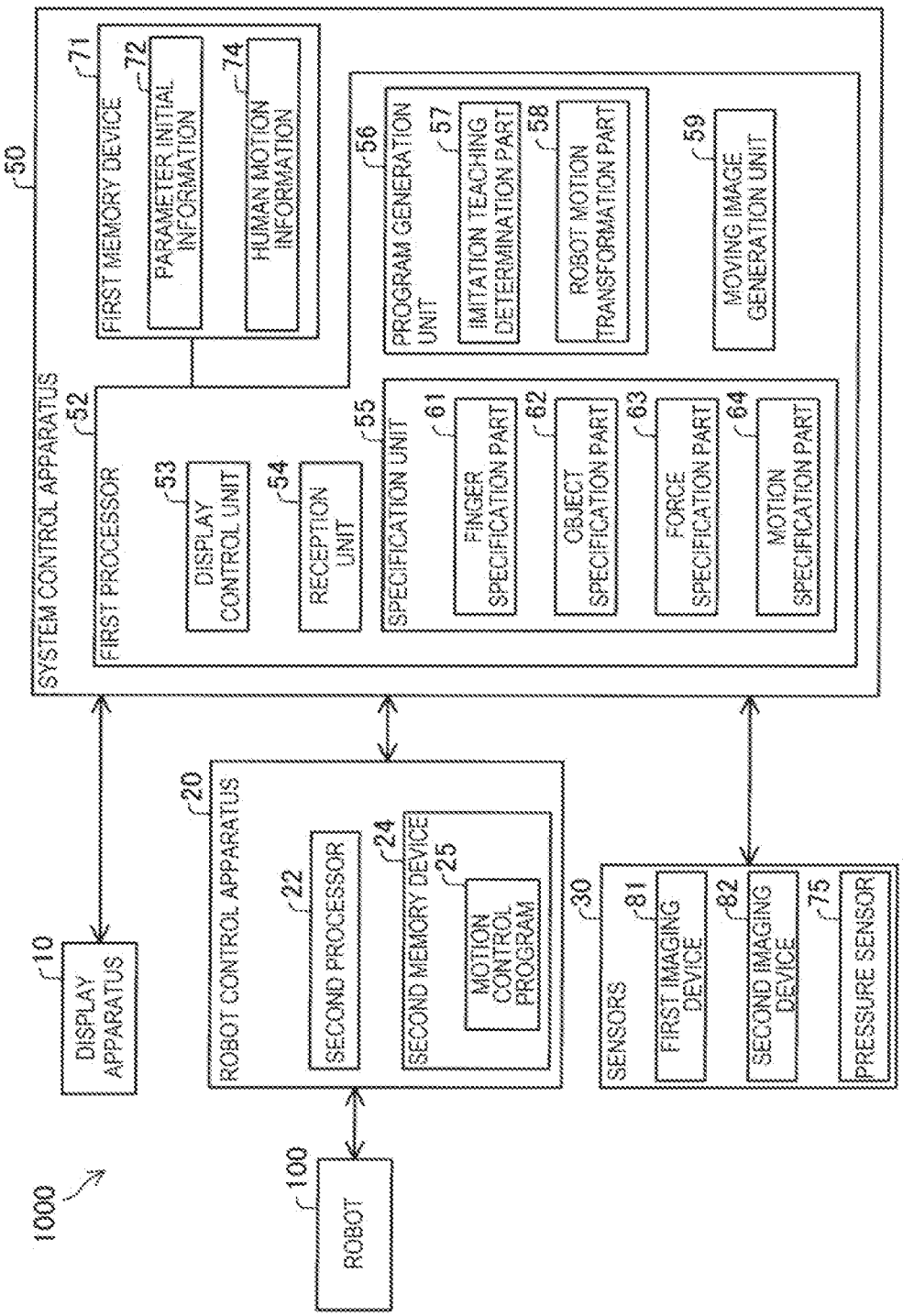
FIG. 2 shows a detailed configuration of the generation system.

FIG. 2 shows a detailed configuration of the generation system 1000. The system control apparatus 50 is a computer including a first processor 52 and a first memory device 71. The system control apparatus 50 executes various programs stored in the first memory device 71, and thereby, functions as a display control unit 53, a reception unit 54, a specification unit 55, a program generation unit 56, and a moving image generation unit 59. The display control unit 53 transmits various kinds of information to be displayed on the display apparatus 10 and controls display operation of the display apparatus 10. The reception unit 54 receives input from outside via an input interface such as a keyboard and a mouse.

The specification unit 55 specifies the motion of the human 80 based on data including the detection results from the sensors 30. The specification unit 55 has a finger specification part 61, an object specification part 62, a force specification part 63, and a motion specification part 64.

The finger specification part 61 specifies the positions and the attitudes of the fingers of the human 80 at predetermined time intervals using captured images and depth information acquired from the first imaging device 81. For example, markers are attached to the fingers of the human 80 desired to be specified and the finger specification part 61 specifies the positions and the attitudes of the fingers by detecting the markers in the captured images. Note that, in another embodiment, the finger specification part 61 may specify the positions and the attitudes of the fingers using another method of pattern matching or the like.

The object specification part 62 specifies a position and an attitude of the workpiece WK at predetermined time intervals using captured images and depth information acquired from the first imaging device 81. For example, the object specification part 62 performs image processing such as edge extraction on the captured images and specifies the workpiece WK from the extracted edges. Then, the object specification part 62 specifies the position and the attitude of the workpiece WK specified using the captured images and the depth information.

The force specification part 63 specifies magnitude of the force for gripping the workpiece WK by the human 80 by receiving the detection signal from the pressure sensor 75 at predetermined time intervals.

The motion specification part 64 specifies the motion of the human 80 by time-sequentially arranging (i) the positions of the fingers of the human 80 specified by the finger specification part 61, (ii) the position of the workpiece WK specified by the object specification part 62, and (iii) the magnitude of the force at predetermined time intervals using a predetermined coordinate system and a physical quantity. In the embodiment, the predetermined coordinate system is e.g., a camera coordinate system of the first imaging device 81. The specified motion of the human 80 is stored as human motion information 74 in the first memory device 71. The human motion information 74 includes parameters for moving the robot 100 and details of the respective parameters. The details of the human motion information 74 will be described later.

The first memory device 71 includes a ROM, a RAM, etc. and stores parameter initial information 72 and the human motion information 74 in addition to various programs executed by the first processor 52. The parameter initial information 72 includes the parameters necessary for the motion of the robot 100 and the details thereof and used when the robot 100 is moved without reference to the details of the parameters specified by the specification unit 55. The details of the parameter initial information 72 will be described later.

The program generation unit 56 generates the motion control program for the robot 100 based on the parameter initial information 72 and the motion of the human 80 specified by the specification unit 55. The program generation unit 56 has an imitation teaching determination part 57 and a robot motion transformation part 58. The imitation teaching determination part 57 determines whether the details of the parameter specified by the specification unit 55 or the details of the parameter of the parameter initial information 72 are used with respect to each parameter used when the motion control program is generated based on the imitation parameter received via the reception unit 54. The robot motion transformation part 58 generates the motion control program using a transformation program including a transformation matrix predetermined by inverse kinematics using the details defined in the respective parameters determined by the imitation teaching determination part 57.

The moving image generation unit 59 generates a motion check moving image PI showing the motion of the human 80 specified by the specification unit 55 and the motion of the robot 100 when the motion control program generated by the program generation unit 56 is executed. The motion check moving image PI is displayed by the display apparatus 10 under control by the display control unit 53. The motion check moving image PI has a human moving image PIA1 acquired by imaging of the motion of the human 80 by the first imaging device 81 and a robot moving image PIA2 showing the motion of the robot 100 simulated based on the motion control program generated by the program generation unit 56. The robot moving image PIA2 as a simulation moving image is generated by the moving image generation unit 59. As the human moving image PIA1, a moving image formed by imaging of the motion of the human 80 using the first imaging device 81 for imitation teaching is used. Note that, in another embodiment, the robot moving image PIA2 may have a moving image acquired by imaging of the motion of the robot 100 executing the motion control program generated by the program generation unit 56 using the second imaging device 82.

FIG. 3 is a diagram for explanation of the parameter initial information 72. The parameter initial information 72 defines a plurality of parameters for moving the robot 100 and details of motions of the robot 100 preset with respect to each parameter. The respective parameters are "movement trajectory", "workpiece position", "workpiece gripping position", "force to workpiece", "movement speed", and "preliminary motion". "Movement trajectory" is a parameter relating to the movement trajectory of the workpiece WK. "Workpiece position" is a parameter relating to the positions before and after the movement of the workpiece WK. "Force to workpiece" is a parameter relating to the magnitude of the force applied to the workpiece WK. "Movement speed" is a parameter relating to the movement speed of the workpiece WK. "Preliminary motion" is a parameter relating to the motion of the robot 100 performed before the workpiece WK is moved.

When the program generation unit 56 generates the motion control program for the robot using the parameter initial information 72, the robot 100 moves in the following manner. The robot 100 moves so that the movement trajectory from the start point before the movement to the end point after the movement may be the shortest. Note that, in another embodiment, the robot 100 may move so that the movement trajectory may be a trajectory in which the motions of the respective joints of the robot 100 may be minimum or another predetermined trajectory. The robot 100 moves so that the positions before and after the movement of the workpiece WK may be the positions corresponding to the movement trajectory of the parameter. Note that the positions before and after the movement of the workpiece WK may be determined in advance. With respect the gripping position that the robot 100 grips the workpiece WK, the robot 100 moves to grip a predetermined position. The predetermined position is e.g., a position at coordinates of the center of the gripped surface of the workpiece WK. The robot 100 moves so that the magnitude of the force applied to the workpiece WK when the robot 100 grips may be a predetermined initial value. The robot 100 moves so that the movement speed of the workpiece WK may be the highest value of the movement speed that can be taken by the TCP of the robot 100. In the parameter initial information 72, the preliminary motion of the robot 100 is not set. The details of the respective parameters of the parameter initial information 72 are specified by various coordinate systems and physical quantities including a speed. For example, the movement speed of the workpiece WK is specified by a physical quantity. The relational expression showing the relationship between the respective coordinate systems including the robot coordinate system and the sensor coordinate system and the relational expression for transformation of the physical quantity into a control program for the robot 100 are defined in advance, and thereby, the details of the respective parameters shown by some coordinate system and physical quantity may be transformed into the motion control program for the robot 100.

FIG. 4 is a diagram for explanation of the human motion information 74. The human motion information 74 defines a plurality of parameters for moving the robot 100 and details of the motion of the human 80 specified by the specification unit 55. The respective parameters of the human motion information 74 are different from the respective parameters of the parameter initial information 72 shown in FIG. 3 in that the motion performed by the human 80 is a subject for motion teaching. That is, the respective parameters of the human motion information 74 are parameters relating to the motion of the human 80. In the human motion information 74, "movement trajectory" as the parameter is a parameter showing the movement trajectory of the workpiece WK. In the human motion information 74, "workpiece position" as the parameter is a parameter showing the positions before and after the movement of the workpiece WK when the human 80 moves the workpiece WK. In the human motion information 74, "workpiece gripping position" as the parameter is a parameter showing the gripping position that the human 80 grips the workpiece WK. In the human motion information 74, "force to workpiece" as the parameter is a parameter showing the magnitude of the force applied to the workpiece WK when the human 80 grips the workpiece WK. In the human motion information 74, "movement speed" as the parameter is a parameter showing the movement speed of the workpiece WK when the human 80 moves the workpiece WK. In the human motion information 74, "preliminary motion" as the parameter is a parameter showing the motion performed before the human 80 moves the workpiece WK. The details of the respective parameters are specified by the specification unit 55 using e.g., the camera coordinate system and the physical quantities including a speed.

As shown in FIG. 2, the robot control apparatus 20 is a computer including a second processor 22 and a second memory device 24. The second processor 22 controls the motion of the robot 100 by executing a motion control program 25 stored in the second memory device 24. The second memory device 24 includes a RAM and a ROM. In the second memory device 24, the motion control program 25 generated by the program generation unit 56 of the system control apparatus 50 is stored.

Figure 5:
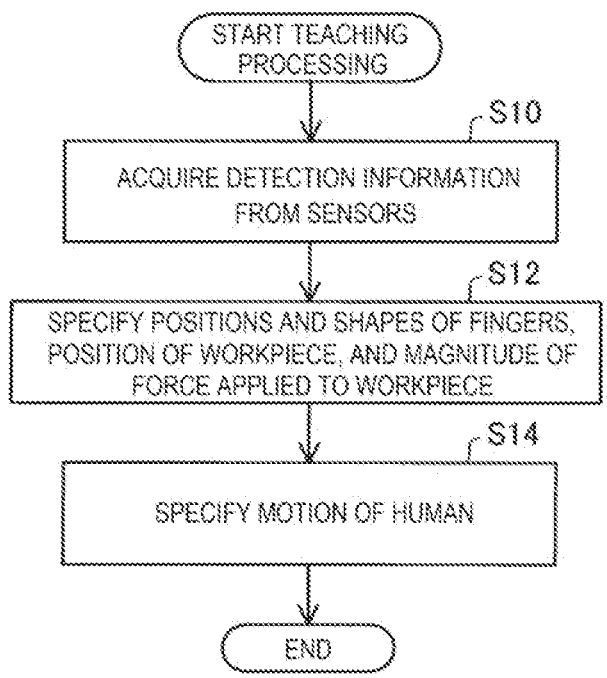
FIG. 5 is a flowchart showing teaching processing of a robot.

FIG. 5 is a flowchart showing teaching processing of the robot 100. First, at step S10, the human 80 with the pressure sensor 75 executes the teaching motion to the robot 100 before the first imaging device 81, and thereby, the system control apparatus 50 acquires detection information from the sensors 30. Specifically, at step S10, the system control apparatus 50 acquires the captured image and the depth information from the first imaging device 81 and the detection signal from the pressure sensor 75 at predetermined time intervals.

Then, at step S12, the specification unit 55 of the system control apparatus 50 specifies the positions and the shapes of the fingers of the human 80, the position of the workpiece WK, and the magnitude of the force applied to the workpiece WK from the human 80 at the predetermined time intervals using the acquired captured images, depth information, and detection signals.

Then, at step S14, the specification unit 55 specifies the motion of the human 80 including the preliminary motion using the positions and the shapes of the fingers of the human 80, the position of the workpiece WK, and the magnitude of the force specified at step S12. The specified motion of the human 80 is stored as the human motion information 74 in the first memory device 71. Note that, regarding the magnitude of the force applied from the human 80, a parameter of the human motion information 74 is defined as details of "force to workpiece". As the preliminary motion, the details are defined by, for example, the human 80 performing a predetermined gesture before gripping the workpiece WK. For example, when the human 80 performs a gesture of moving close to the workpiece WK with the closed hand and opening the hand at a predetermined distance to the workpiece WK, the details of the above described gesture motion are defined as "preliminary motion" in the human motion information 74. When the motion control program is generated with reference to the preliminary motion in the human motion information 74, the robot 100 generates the motion control program for controlling the robot 100 to execute the motion to imitate the preliminary motion defined in the human motion information 74, that is, to execute the motion to keep the closed state of the gripper as the end effector 140 until the gripper moves close to the workpiece WK and open the gripper at a predetermined distance to the workpiece WK.

Figure 6:
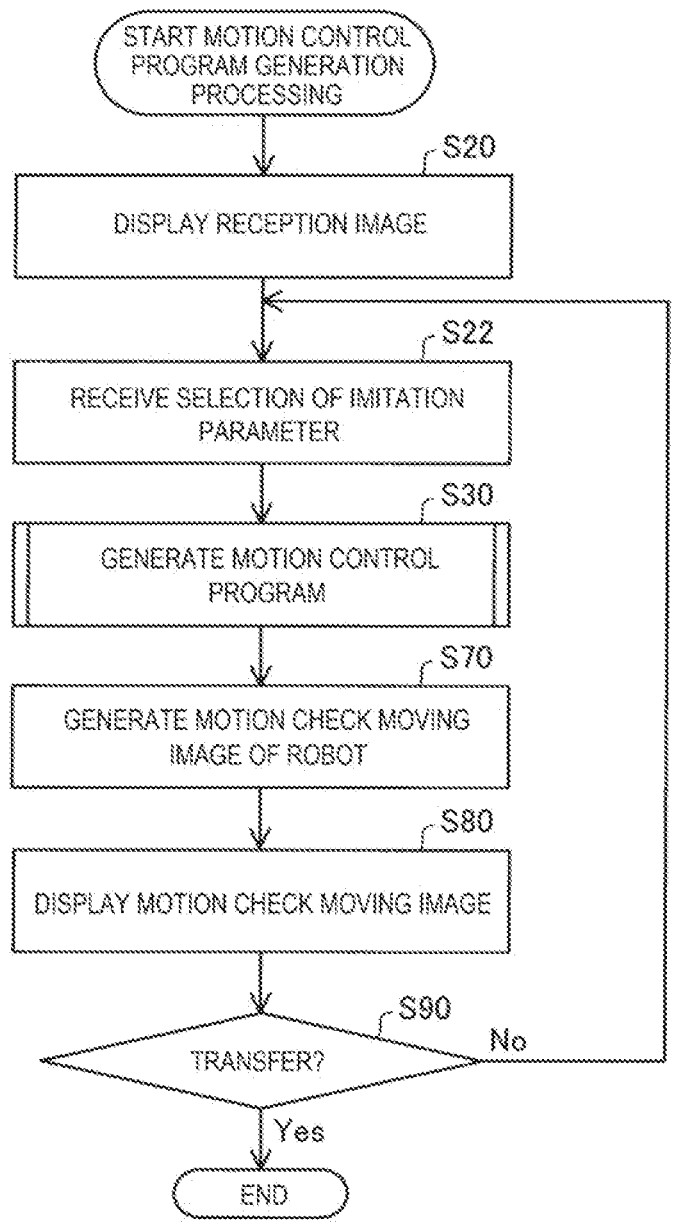
FIG. 6 is a flowchart showing generation processing of a motion control program for the robot.

FIG. 6 is a flowchart showing generation processing of the motion control program for the robot 100. FIG. 7 is a diagram for explanation of the generation processing of the motion control program. FIG. 7 shows a window displayed on the display apparatus 10. The generation processing shown in FIG. 6 may be automatically started after the teaching processing shown in FIG. 5 ends or started when a start command from a user is received.

As shown in FIG. 6, at step S20, the display control unit 53 of the system control apparatus 50 displays a reception image IM for reception of an instruction from the user for generation of the motion control program. As shown in FIG. 7, the reception image IM is an image for reception of a selection of the motion to be imitated by the robot 100 of the motions of the human 80 specified at step S14 in FIG. 5. The reception image IM has an input explanatory image IM0, a parameter explanatory image IM1, a parameter selection image IM2, an enter image IM3, and a set image IM4. The input explanatory image IM0 is an image for prompting the user to input via the reception image IM. The parameter explanatory image IM1 includes images showing a plurality of parameters and character images for explanation of the respective parameters. The respective parameters in the parameter explanatory image IM1 correspond to the respective parameters in the parameter initial information 72 and the human motion information 74. The respective parameters in the parameter explanatory image IM1 are parameters relating to the motion of the human 80 and candidate parameters referred to, i.e., imitated by the robot 100.

The parameter selection image IM2 is an image for determination as to whether each of the plurality of parameters is selected as an imitation parameter as a parameter to be imitated by the robot 100. The parameter selection image IM2 includes images showing "YES" and "NO" placed on the sides of the respective parameters of the parameter explanatory image IM1. The user selects "YES" for the parameter of the motion of the human 80 to be imitated by the robot 100 and "NO" for the parameter of the motion of the human 80 not to be imitated by the robot 100 using the input device such as a mouse. The parameter for which "YES" is selected as the imitation parameter.

The enter image IM3 is an image for reception of the information selected using the parameter selection image IM2 via the reception unit 54. The user selects the enter image IM3 using the input interface such as a mouse, and thereby, the selection information selected using the parameter selection image IM2 is received by the reception unit 54. The received selection information is stored in the first memory device 71. That is, as step S22, the enter image IM3 is selected, and thereby, the reception unit 54 receives the selection of the imitation parameter as the parameter to be imitated by the robot 100 of the plurality of parameters displayed in the parameter explanatory image IM1. Further, the enter image IM3 is selected, and thereby, the moving image generation unit 59 generates the above described motion check moving image PI. The set image IM4 is used for transfer of the motion control program generated by the program generation unit 56 to the robot control apparatus 20. When the set image IM4 is selected, the motion control program generated by the program generation unit 56 is transferred to the robot control apparatus 20.

Then, at step S30 shown in FIG. 6, the program generation unit 56 generates the motion control program with reference to the motion of the human 80 corresponding to the imitation parameter and the parameter initial information 72. Specifically, the program generation unit 56 specifies the details of the motion of the human 80 corresponding to the imitation parameter from the human motion information 74 and details of the motion of the other parameters than the imitation parameter of the plurality of parameters from the parameter initial information 72. Then, the program generation unit 56 generates the motion control program from the specified details of the motion using a transformation program including a transformation matrix predetermined by inverse kinematics. As described above, in the process of generating the motion control program at step S30, the motion control program is generated using the parameter initial information 72 with respect to the other parameters than the imitation parameter of the plurality of parameters.

Figure 8:
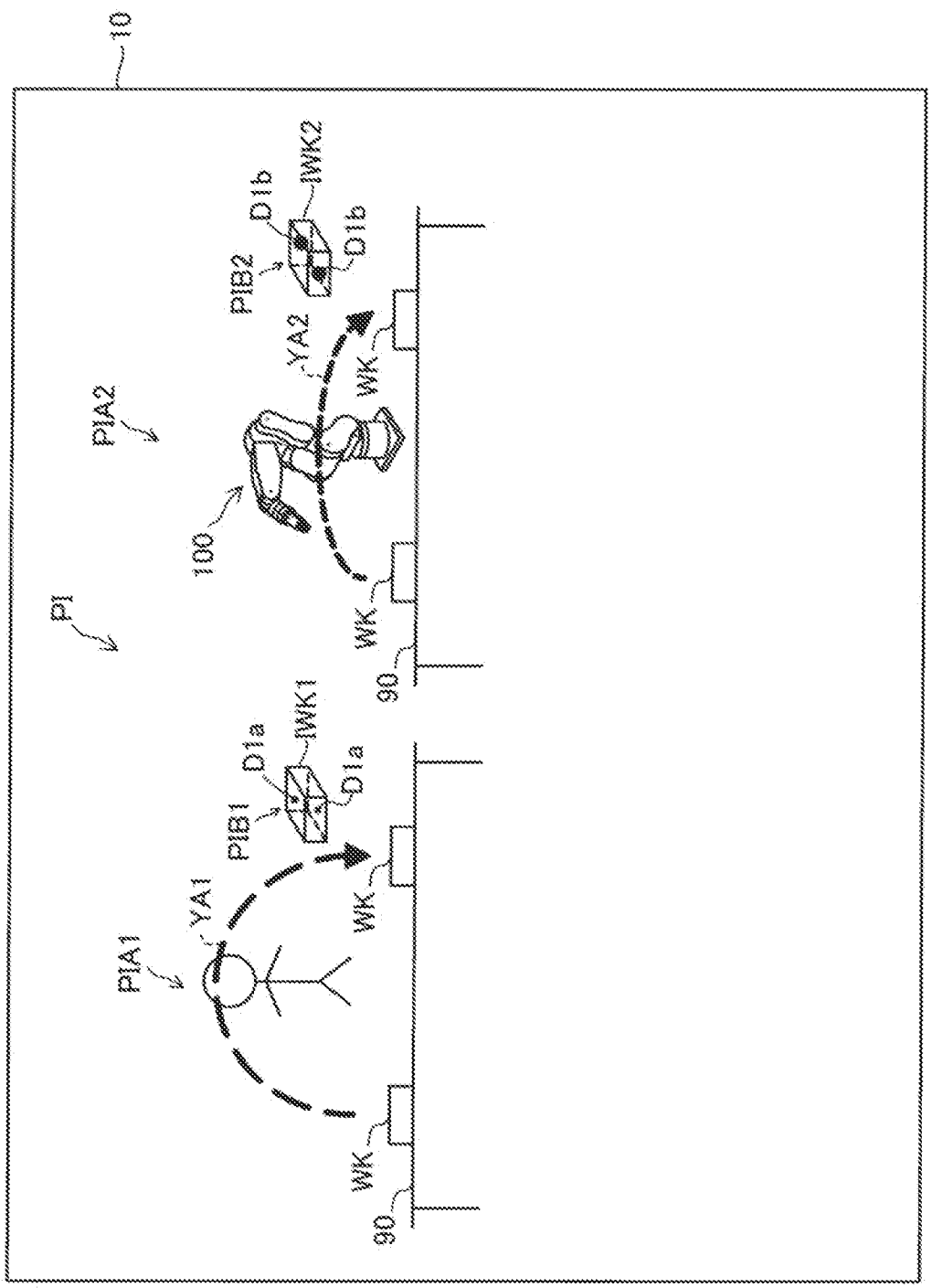
FIG. 8 shows a motion check moving image.

Then, at step S70, the moving image generation unit 59 generates the motion check moving image PI. FIG. 8 shows the motion check moving image PI. The motion check moving image PI has the above described human moving image PIA1 and robot moving image PIA2, a human auxiliary image PIB1, and a robot auxiliary image PIB2. For convenience of illustration, regarding the human moving image PIA1 and the robot moving image PIA2 shown in FIG. 8, the movement trajectories of the workpieces WK are shown by dotted arrows YA1, YA2 and the movement speeds of the workpieces WK are indicated by lengths of the dotted lines. The longer the dotted line, the lower the movement speed. The human auxiliary image PIB1 is an image showing the gripping position of the workpiece WK and the magnitude of the force for gripping the workpiece WK of the motion of the human 80 specified by the specification unit 55 in the motion teaching. Note that the human moving image PIA1 and the robot moving image PIA2 contain the images of the working benches 90.

The human auxiliary image PIB1 has a first workpiece image IWK1 imitating the workpiece WK and first point images D1a overlapped with the first workpiece image IWK1. The positions and the sizes of the first point images D1a in the first workpiece image IWK1 show the gripping position and the magnitude of the gripping force of the human 80 gripping the workpiece WK in the motion teaching. The larger the first point images D1a, the larger the gripping force.

The robot auxiliary image PIB2 has a second workpiece image IWK2 imitating the workpiece WK and second point images D1b overlapped with the second workpiece image IWK2. The positions of the second point images D1b in the second workpiece image IWK2 show the gripping position that the robot 100 grips the workpiece WK. The sizes of the second point images D1b show the magnitude of the force of the robot 100 gripping the workpiece WK. The larger the second point images D1b, the larger the gripping force.

Figure 9:
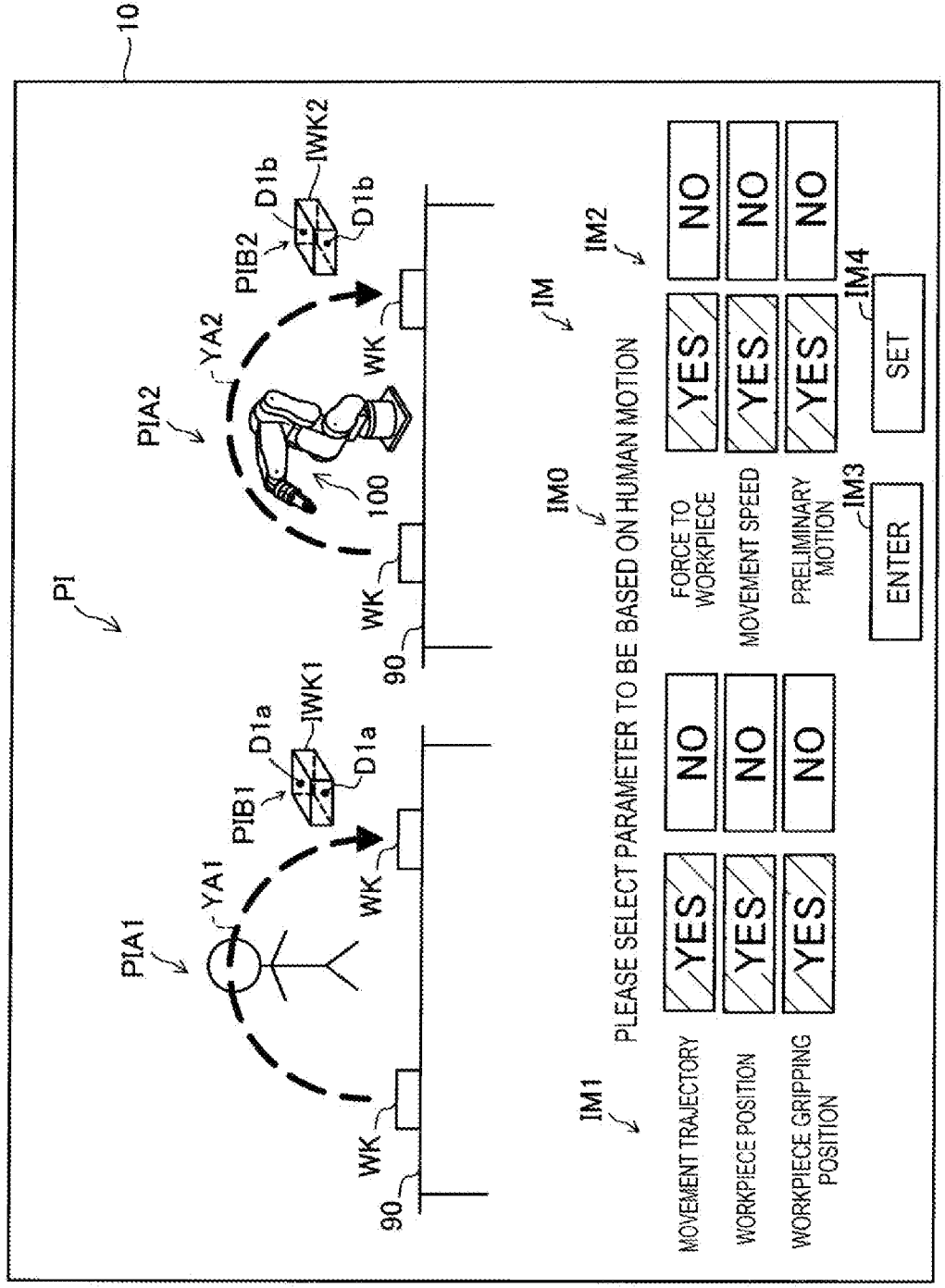
FIG. 9 shows a window displayed on a display apparatus by execution of step S80.

As shown in FIG. 6, next to step S70, at step S80, the display control unit 53 displays the generated motion check moving image PI on the display apparatus 10. FIG. 9 shows a window displayed on the display apparatus 10 by execution of step S80. The display control unit 53 displays the motion check moving image PI in the same window as that of the reception image IM on the display apparatus 10. In the example shown in FIG. 9, all parameters are selected as imitation parameters referring to the motion of the human 80.

At step S90 next to step S80 shown in FIG. 6, the program generation unit 56 determines whether the motion control program generated at step S30 is transferred to the robot control apparatus 20. That is, at step S90, whether the motion control program generated at step S30 is determined as the final program for controlling the motion of the robot 100. At step S90, when the set image IM4 shown in FIG. 9 is selected, a determination "Yes" is made and the motion control program is transferred to the robot control apparatus 20.

On the other hand, when wishing to correct the generated motion control program with reference to the motion check moving image PI, the user selects the images showing "YES" or "NO" of the parameter selection image IM2, and then, selects the enter image IM3 again. Thereby, step S22 and the subsequent steps are executed again. Note that, when the user wishes to correct the generated motion control program with reference to the motion check moving image PI, the human 80 may perform the teaching motion to execute the teaching processing shown in FIG. 5 again.

Figure 10:
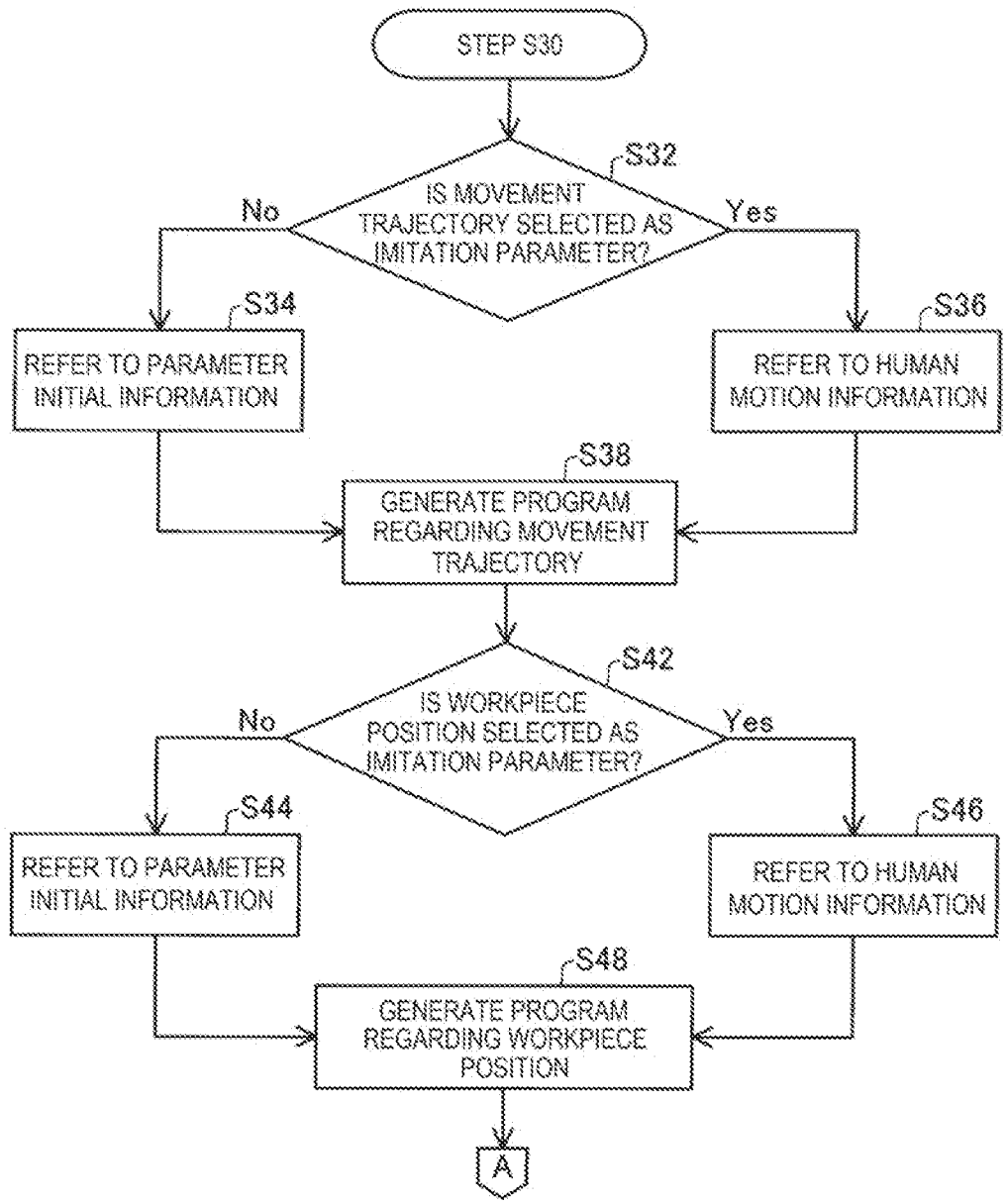
FIG. 10 is a first flowchart showing details of step S30 shown in FIG. 6.

FIG. 10 is a first flowchart showing details of step S30 shown in FIG. 6. At step S32, the imitation teaching determination part 57 determines whether "movement trajectory" is selected as the imitation parameter. When the determination at step S32 is "Yes", at step S36, the robot motion transformation part 58 determines that the parameter in the human motion information 74 refers to the time-sequential movement trajectory of the workpiece WK as the details of "movement trajectory" when the motion control program is generated. Then, at step S38, the robot motion transformation part 58 generates a program regarding the movement trajectory of the workpiece WK of the motion control program for the robot 100. Specifically, at step S38 in a case via step S36, the robot motion transformation part 58 generates the motion control program so that the movement trajectory of the workpiece WK by the motion of the robot 100 may be the movement trajectory defined in the human motion information 74.

On the other hand, when the determination at step S32 is "No", at step S34, the robot motion transformation part 58 determines that the parameter in the parameter initial information 72 refers to the details of "movement trajectory" when the motion control program is generated. Then, at step S38 in a case via step S34, the robot motion transformation part 58 generates the motion control program so that the movement trajectory of the workpiece WK by the motion of the robot 100 may be the movement trajectory defined in the parameter initial information 72.

At step S42, the imitation teaching determination part 57 determines whether "workpiece position" is selected as the imitation parameter. When the determination at step S42 is "Yes", at step S46, the robot motion transformation part 58 determines that the parameter in the human motion information 74 refers to the positions before and after the movement of the workpiece WK as the details of "workpiece position" when the motion control program is generated. Then, at step S48, the robot motion transformation part 58 generates a program regarding the positions before and after the movement of the workpiece WK of the motion control program for the robot 100. Specifically, at step S48 in a case via step S46, the robot motion transformation part 58 generates the motion control program so that the positions before and after the movement of the workpiece WK by the motion of the robot 100 may be positions before and after the movement defined in the human motion information 74.

On the other hand, when the determination at step S42 is "No", at step S44, the robot motion transformation part 58 determines that the parameter in the parameter initial information 72 refers to the details of "workpiece position" when the motion control program is generated. Then, at step S48 in a case via step S44, the robot motion transformation part 58 generates the motion control program so that the positions before and after the movement of the workpiece WK by the motion of the robot 100 may be positions defined in the parameter initial information 72.

Figure 11:
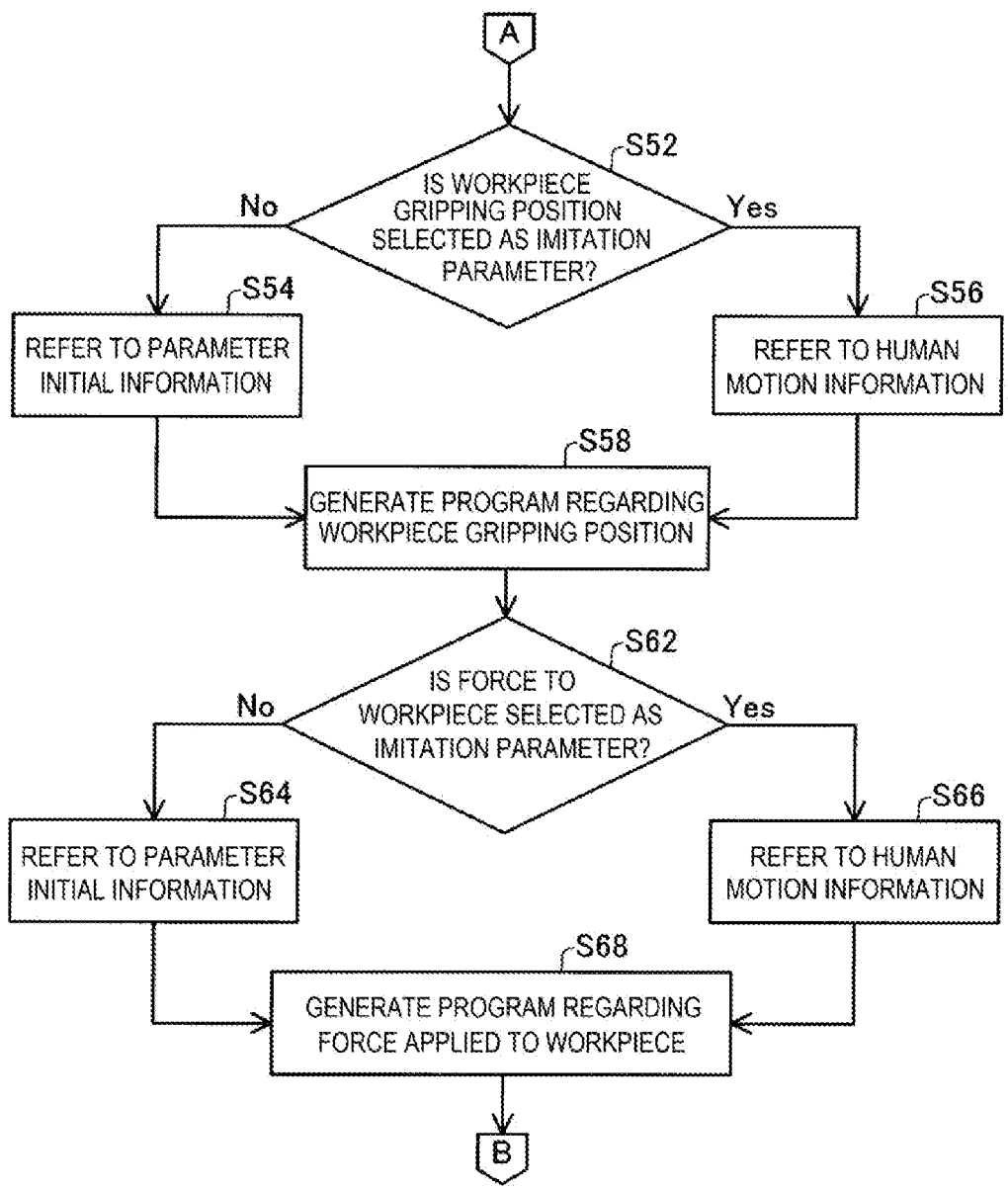
FIG. 11 is a second flowchart showing details of step S30 shown in FIG. 6.

FIG. 11 is a second flowchart showing details of step S30 shown in FIG. 6. At step S52, the imitation teaching determination part 57 determines whether "workpiece gripping position" is selected as the imitation parameter. When the determination at step S52 is "Yes", at step S56, the robot motion transformation part 58 determines that the parameter in the human motion information 74 refers to the details of "gripping position" when the motion control program is generated. Then, at step S58, the robot motion transformation part 58 generates a program regarding the gripping position that the robot 100 grips the workpiece WK of the motion control program for the robot 100. Specifically, at step S58 in a case via step S56, the robot motion transformation part 58 generates the motion control program so that the gripping position of the workpiece WK by the motion of the robot 100 may be the gripping position defined in the human motion information 74.

On the other hand, when the determination at step S52 is "No", at step S54, the robot motion transformation part 58 determines that the parameter in the parameter initial information 72 refers to the details of "gripping position of workpiece" when the motion control program is generated. Then, at step S58 in a case via step S54, the robot motion transformation part 58 generates the motion control program so that the gripping position of the workpiece WK by the motion of the robot 100, that is, the gripping position that the robot 100 grips the workpiece WK may be the gripping position defined in the parameter initial information 72.

At step S62, the imitation teaching determination part 57 determines whether "force to workpiece" is selected as the imitation parameter. When the determination at step S62 is "Yes", at step S66, the robot motion transformation part 58 determines that the parameter in the human motion information 74 refers to the details of "force to workpiece" when the motion control program is generated. Then, at step S68, the robot motion transformation part 58 generates a program regarding the force applied to the workpiece WK of the motion control program for the robot 100. Specifically, at step S68 in a case via step S66, the robot motion transformation part 58 generates the motion control program so that the magnitude of the force for gripping the workpiece WK by the motion of the robot 100 may be the magnitude of the force defined in the human motion information 74.

On the other hand, when the determination at step S62 is "No", at step S64, the robot motion transformation part 58 determines that the parameter in the parameter initial information 72 refers to the details of "force to workpiece" when the motion control program is generated. Then, at step S68 in a case via step S64, the robot motion transformation part 58 generates the motion control program so that the magnitude of the force for gripping the workpiece WK by the motion of the robot 100 may be the magnitude of the force defined in the parameter initial information 72.

Figure 12:
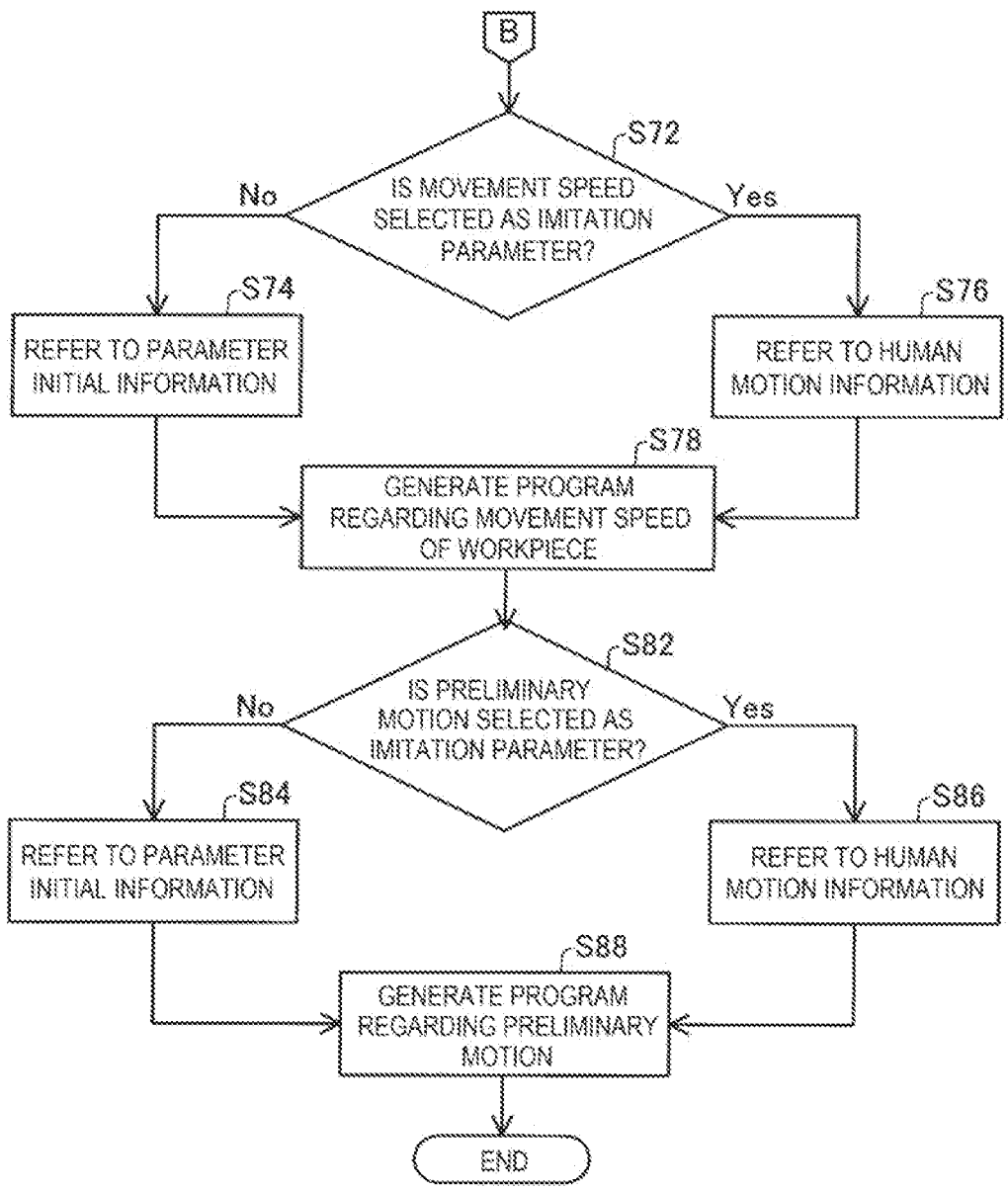
FIG. 12 is a third flowchart showing details of step S30 shown in FIG. 6.

FIG. 12 is a third flowchart showing details of step S30 shown in FIG. 6. At step S72, the imitation teaching determination part 57 determines whether "movement speed" is selected as the imitation parameter. When the determination at step S72 is "Yes", at step S76, the robot motion transformation part 58 determines that the parameter in the human motion information 74 refers to the details of "movement speed" when the motion control program is generated. Then, at step S78, the robot motion transformation part 58 generates a program regarding the movement speed of the workpiece WK of the motion control program for the robot 100. Specifically, at step S78 in a case via step S76, the robot motion transformation part 58 generates the motion control program so that the movement speed of the workpiece WK by the motion of the robot 100 may be the movement speed defined in the human motion information 74.

On the other hand, when the determination at step S72 is "No", at step S74, the robot motion transformation part 58 determines that the parameter in the parameter initial information 72 refers to the details of "movement speed" when the motion control program is generated. Then, at step S78 in a case via step S74, the robot motion transformation part 58 generates the motion control program so that the movement speed of the workpiece WK by the motion of the robot 100 may be the movement speed defined in the parameter initial information 72.

At step S82, the imitation teaching determination part 57 determines whether "preliminary motion" is selected as the imitation parameter. When the determination at step S82 is "Yes", at step S86, the robot motion transformation part 58 determines that the parameter in the human motion information 74 refers to the details of "preliminary motion" when the motion control program is generated. Then, at step S88, the robot motion transformation part 58 generates a program regarding the preliminary motion of the motion control program for the robot 100. Specifically, at step S88 in a case via step S86, the robot motion transformation part 58 generates the motion control program so that the preliminary motion may be details defined in the human motion information 74 in the motion of the robot 100.

On the other hand, when the determination at step S82 is "No", at step S84, the robot motion transformation part 58 determines that the parameter in the parameter initial information 72 refers to the details of "preliminary motion" when the motion control program is generated. Then, at step S88 in a case via step S84, the robot motion transformation part 58 generates the motion control program so that the preliminary motion in the motion of the robot 100 may be the details defined in the parameter initial information 72. As shown in FIG. 3, inexecution of "preliminary motion" is defined as the details in the parameter initial information 72 and, in the embodiment, the gripper as the end effector 140 moves close to the workpiece WK in the opened state.

Figure 13:
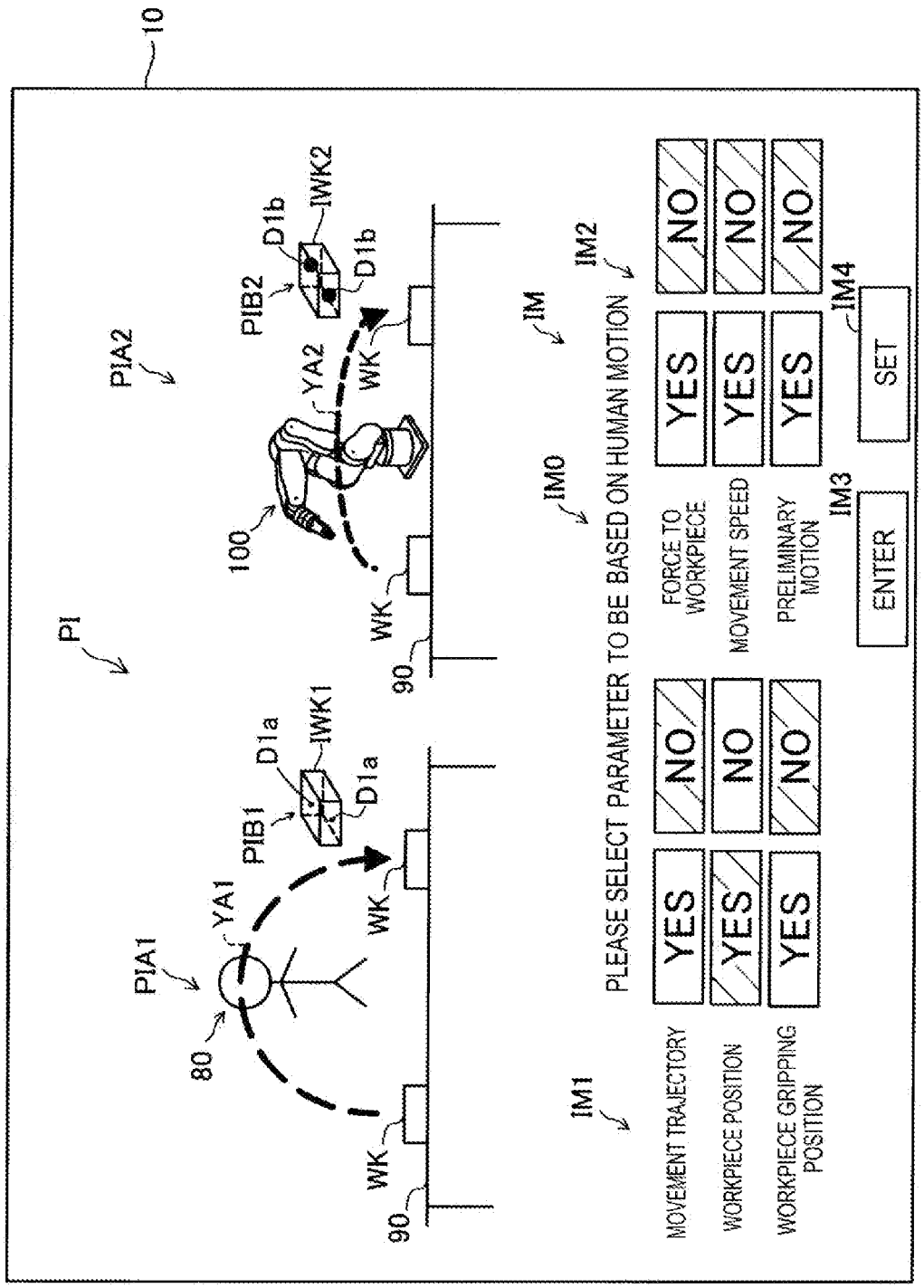
FIG. 13 shows a first example of the motion check moving image and a reception image.

FIG. 13 shows a first example of the motion check moving image PI and the reception image IM. Selection of images with single hatches of the parameter selection image IM2 is shown. This applies in the subsequent drawings. In FIG. 13, of the plurality of parameters, only "workpiece position" is selected as the imitation parameter referring to the motion of the human 80. In this case, in the robot moving image PIA2 displayed on the display apparatus 10, the positions before and after the movement of the workpiece WK are the positions defined by the human motion information 74. That is, the positions before and after the movement of the workpiece WK on the working bench 90 in the human moving image PIA1 and the positions before and after the movement of the workpiece WK on the working bench 90 in the robot moving image PIA2 are the same.

Figure 14:
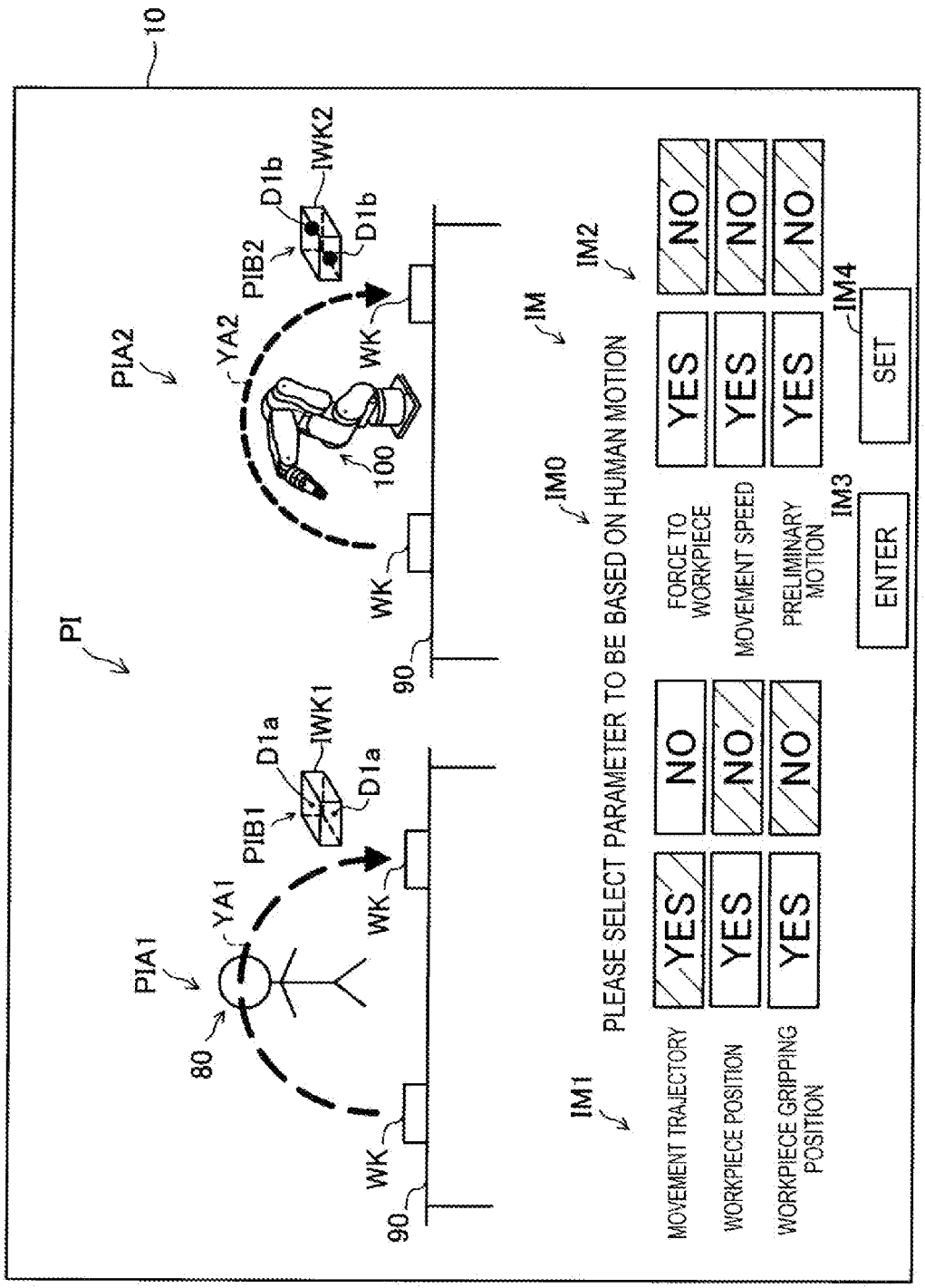
FIG. 14 shows a second example of the motion check moving image and the reception image.

FIG. 14 shows a second example of the motion check moving image PI and the reception image IM. In FIG. 14, of the plurality of parameters, only "movement trajectory" is selected as the imitation parameter referring to the motion of the human 80. In this case, in the robot moving image PIA2 displayed on the display apparatus 10, only the movement trajectory of the workpiece WK is the movement trajectory defined by the human motion information 74. That is, the movement trajectory of the workpiece WK in the human moving image PIA1 and the movement trajectory of the workpiece WK in the robot moving image PIA2 are the same.

Figure 15:
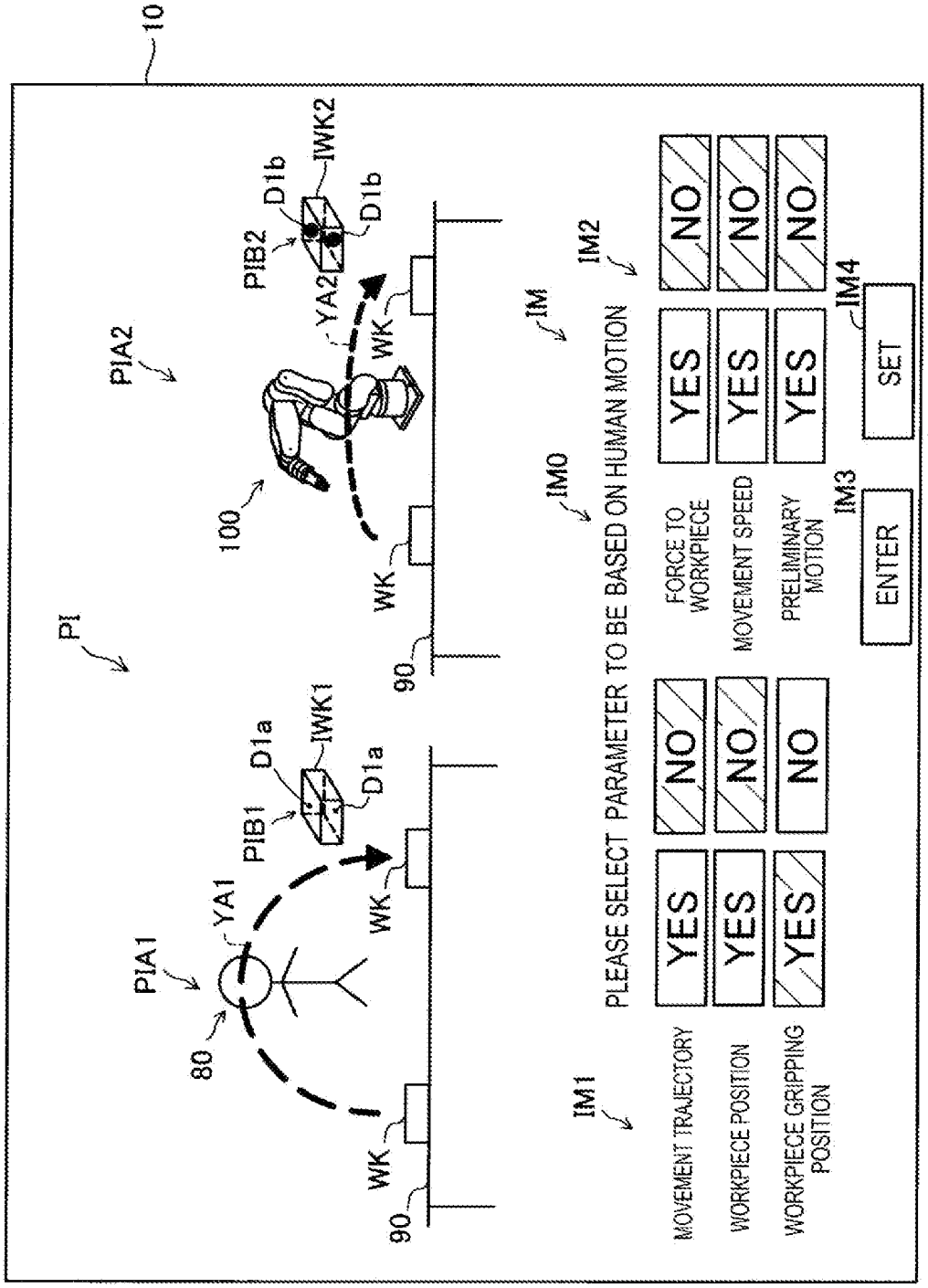
FIG. 15 shows a third example of the motion check moving image and the reception image.

FIG. 15 shows a third example of the motion check moving image PI and the reception image IM. In FIG. 15, of the plurality of parameters, only "workpiece gripping position" is selected as the imitation parameter referring to the motion of the human 80. In this case, in the robot moving image PIA2 displayed on the display apparatus 10, only the gripping position of the workpiece WK is the gripping position defined by the human motion information 74. That is, the positions of the first point images D1a with respect to the first workpiece image IWK1 and the positions of the second point images D1b with respect to the second workpiece image IWK2 are the same.

Figure 16:
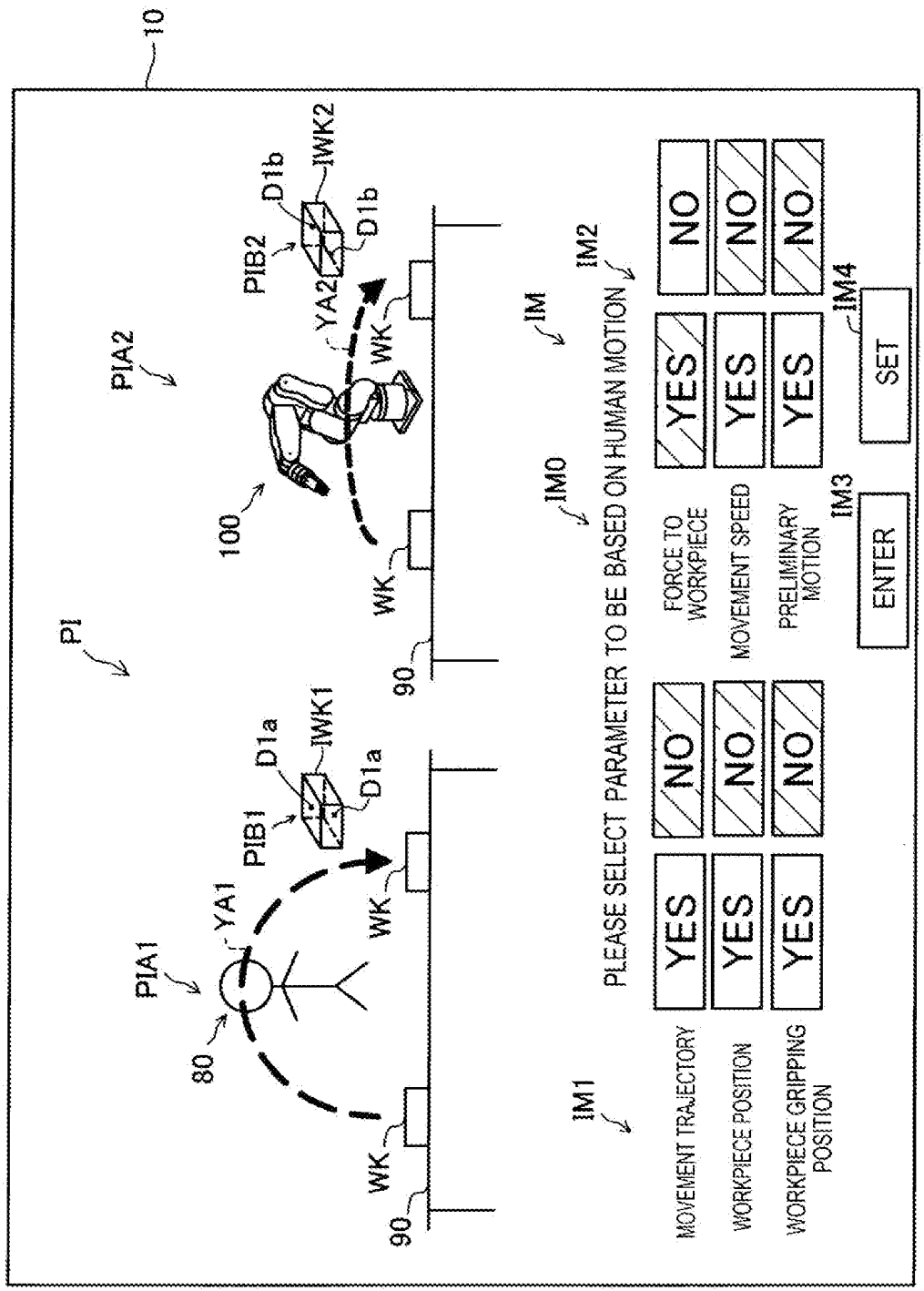
FIG. 16 shows a fourth example of the motion check moving image and the reception image.

FIG. 16 shows a fourth example of the motion check moving image PI and the reception image IM. In FIG. 16, of the plurality of parameters, only "force to workpiece" is selected as the imitation parameter referring to the motion of the human 80. In this case, in the robot moving image PIA2 displayed on the display apparatus 10, only the magnitude of the force applied to workpiece WK is the magnitude of the force defined by the human motion information 74. That is, the sizes of the first point images D1a and the sizes of the second point images D1b are the same.

Figure 17:
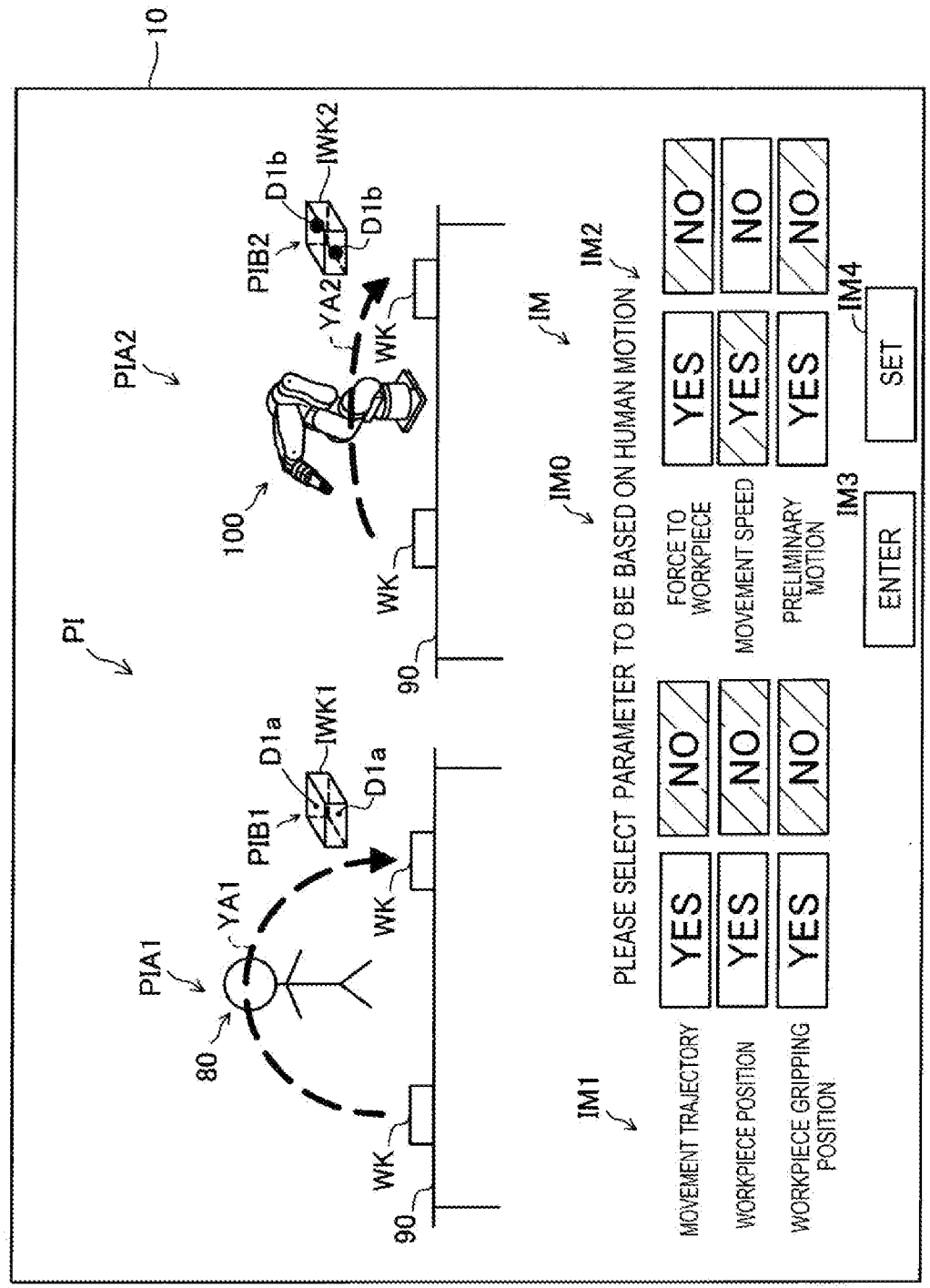
FIG. 17 shows a fifth example of the motion check moving image and the reception image.

FIG. 17 shows a fifth example of the motion check moving image PI and the reception image IM. In FIG. 17, of the plurality of parameters, only "movement speed" is selected as the imitation parameter referring to the motion of the human 80. In this case, in the robot moving image PIA2 displayed on the display apparatus 10, only the movement speed of the workpiece WK by the motion of the robot 100 is the movement speed of the workpiece WK defined by the human motion information 74. That is, the movement speed of the workpiece WK in the human moving image PIA1 and the movement speed of the workpiece WK in the robot moving image PIA2 are the same.

Figure 18:
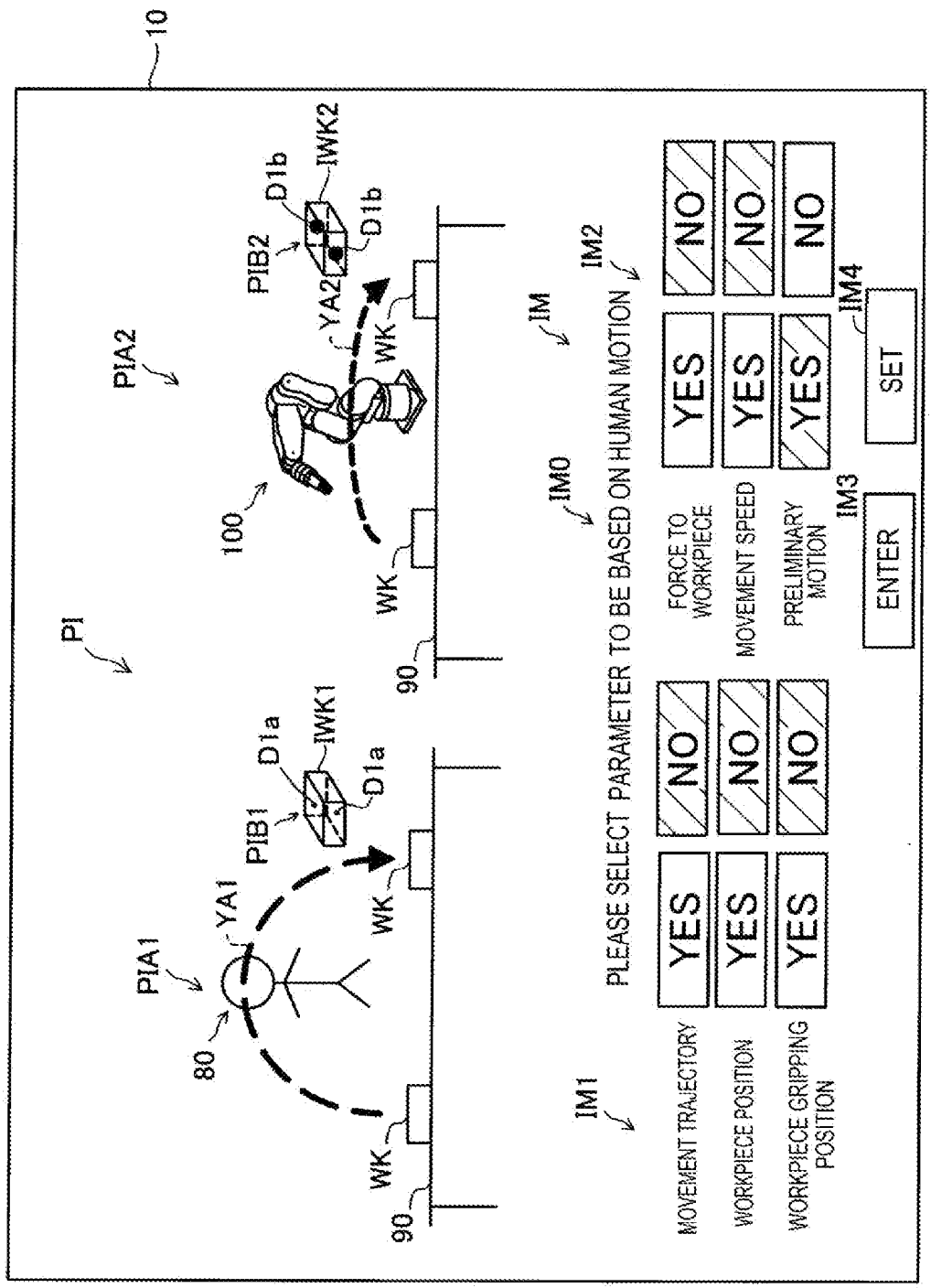
FIG. 18 shows a sixth example of the motion check moving image and the reception image.

FIG. 18 shows a sixth example of the motion check moving image PI and the reception image IM. In FIG. 18, of the plurality of parameters, only "preliminary motion" is selected as the imitation parameter referring to the motion of the human 80. In this case, in the robot moving image PIA2 displayed on the display apparatus 10, only the preliminary motion of the motion of the robot 100 is the preliminary motion defined by the human motion information 74. In the robot moving image PIA2 shown in FIG. 18, the gripper as the end effector 140 keeps the closed state until the gripper moves close to the workpiece WK and opens at a predetermined distance to the workpiece WK.

The user checks the motion check moving image PI in the above described examples in FIGS. 13 to 18, determines the parameter relating to the motion of the human 80 to be imitated by the robot 100, and generates the motion control program by the system control apparatus 50.

According to the above described embodiment, the imitation parameter to be imitated by the robot 100 may be selected from the plurality of parameters relating to the motion of the human 80, and thereby, the motion control program that enables accurate realization of the desired robot motion may be generated. Here, when the motion control program is generated so that the movement trajectory of the workpiece WK by the motion of the human 80 may be the movement trajectory of the workpiece WK by the motion of the robot 100, the motion may be hard for the robot 100 to move. As a result, realization of the desired movement speed of the workpiece WK may be hard. Further, the motion of the human 80 is not necessarily performed in completely the same location as that of the motion of the robot 100. Furthermore, it may be unnecessary to move the workpiece WK by the motion of the robot 100 to the same position as the position after the movement of the workpiece WK by the motion of the human 80. Therefore, as shown in FIG. 7, the imitation parameter to be imitated by the robot 100 may be made selectable from the plurality of parameters relating to the motion of the human 80, and thereby, the system control apparatus 50 may generate the motion control program that enables accurate realization of the desired motion of the robot 100.

Further, according to the above described embodiment, as the plurality of parameters as shown in FIG. 4, the parameters assumed to be highly likely to be imitated by the robot 100 are set. That is, the plurality of parameters are the parameters corresponding to the basic motions performed by the robot 100 when the workpiece WK is moved. Furthermore, according to the above described embodiment, as shown in FIGS. 10 to 12, the program generation unit 56 may generate the motion control program using the parameter initial information 72 with respect to the other parameters than the imitation parameter.

B. Another Embodiment

B-1. Another Embodiment 1

In the above described embodiment, as shown in FIG. 4, the number of the parameters is six, however, may be at least two or more. Alternatively, another parameter may be used.

C. Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined for solving part or all of the problems of the present disclosure or achieving part or all of the effects of the present disclosure. The technical features not described as essential features in this specification can be appropriately deleted.

(1) According to a first aspect of the present disclosure, a generation method of generating a motion control program for a robot is provided. The generation method includes displaying a plurality of parameters relating to a motion of a human, receiving a selection of an imitation parameter as the parameter to be imitated by the robot from the displayed plurality of parameters, and generating the motion control program with reference to the motion of the human corresponding to the received imitation parameter. According to the configuration, the imitation parameter to be imitated by the robot may be selected from the plurality of parameters relating to the motion of the human, and thereby, the motion control program that enables accurate realization of the desired robot motion may be generated.

(2) In the above described aspect, the plurality of parameters may include at least two or more of positions before and after a movement of a workpiece handled by the robot, a movement trajectory of the workpiece, a gripping position that the human grips the workpiece, a movement speed of the workpiece, a force applied to the workpiece by the human, and a preliminary motion performed before the human moves the workpiece. According to the configuration, the plurality of parameters may include at least two parameters corresponding to the basic motions performed by the robot when the workpiece is moved.

(3) In the above described aspect, when the imitation parameter includes the preliminary motion, the generating step may generate the motion control program for controlling the robot to execute a motion imitating the preliminary motion. According to the configuration, as a motion performed by the robot before moving the workpiece, the preliminary motion of the human may be imitated.

(4) In the above described aspect, the generating step may generate the motion control program using preset parameter initial information defining the motion of the robot with respect to another parameter than the imitation parameter of the plurality of parameters. According to the configuration, the motion control program may be generated using the parameter initial information with respect to another parameter than the imitation parameter.

(5) In the above described aspect, the displaying step may display a reception image including a parameter explanatory image showing the plurality of parameters and a parameter selection image for determination as to whether each of the plurality of parameters is selected as the imitation parameter. According to the configuration, the user may easily determine whether to select each of the plurality of parameters as the imitation parameter using the parameter selection image.

The present disclosure can be realized in various other aspects than that described as above. For example, the present disclosure can be realized in aspects of a computer program for controlling a processor to generate a motion control program for a robot, a non-transitory storage medium recording the computer program, a generation system of generating a motion control program for a robot, etc.

What is claimed is:

1. A control method for causing a processor to execute a program stored in a memory, the control method comprising executing on the processor the steps of:
   capturing a motion image of a human by a camera while a teaching operation is conducted by the human, a pressure sensor being attached at a hand of the human;
   obtaining depth information of the human in the motion image;
   obtaining a detection signal from the pressure sensor, the detection signal corresponding to a force value applied to a workpiece by the hand of the human while the teaching operation is conducted;
   generating a plurality of parameters relating to the teaching operation based on the motion image, the depth information, and the detection signal;
   displaying the plurality of parameters;
   receiving a selection of an imitation parameter from the displayed plurality of parameters, the imitation parameter being imitated by a robot;
   generating a motion control program with reference to the teaching operation of the human corresponding to the received imitation parameter; and
   causing the robot to perform a robot operation on the workpiece, the robot operation corresponding to the teaching operation.

2. The generation method according to claim 1, wherein the plurality of parameters include at least two or more of:
   positions before and after a movement of the workpiece handled by the robot;
   a movement trajectory of the workpiece;
   a gripping position that the human grips the workpiece;
   a movement speed of the workpiece;
   the force value applied to the workpiece by the human; and
   a preliminary operation performed before the human moves the workpiece.

3. The generation method according to claim 2, wherein when the imitation parameter includes the preliminary operation, the generating step generates the motion control program for controlling the robot to execute a motion imitating the preliminary operation.

4. The generation method according to claim 1, wherein the generating step generates the motion control program using preset parameter initial information defining the robot operation of the robot with respect to another parameter than the imitation parameter of the plurality of parameters.

5. The generation method according to claim 1, wherein the displaying step displays a reception image including a parameter explanatory image showing the plurality of parameters and a parameter selection image for determination as to whether each of the plurality of parameters is selected as the imitation parameter.

6. A non-transitory computer-readable storage medium storing a computer program for causing a computer to execute a process by a processor so as to perform the steps of:
   capturing a motion image of a human by a camera while a teaching operation is conducted by the human, a pressure sensor being attached at a hand of the human;
   obtaining depth information of the human in the motion image;
   obtaining a detection signal from the pressure sensor, the detection signal corresponding to a force value applied to a workpiece by the hand of the human while the teaching operation is conducted;
   generating a plurality of parameters relating to the teaching operation based on the motion image, the depth information, and the detection signal;
   displaying the plurality of parameters on a display;
   receiving a selection of an imitation parameter from the displayed plurality of parameters, the imitation parameter being imitated by a robot;
   generating a motion control program with reference to the teaching operation of the human corresponding to the received imitation parameter; and
   causing the robot to perform a robot operation on the workpiece, the robot operation corresponding to the teaching operation.

7. A control system comprising:
   a memory configured to store a program; and
   a processor configured to execute the program so as to:
      capture a motion image of a human by a camera while a teaching operation is conducted by the human, a pressure sensor being attached at a hand of the human;
      obtain depth information of the human in the motion image;
      obtain a detection signal from the pressure sensor, the detection signal corresponding to a force value applied to a workpiece by the hand of the human while the teaching operation is conducted;
      generate a plurality of parameters relating to the teaching operation based on the motion image, the depth information, and the detection signal;
      display the plurality of parameters on a display;
      receive a selection of an imitation parameter from the displayed plurality of parameters, the imitation parameter being imitated by a robot;
      generate a motion control program with reference to the teaching operation of the human corresponding to the received imitation parameter; and
      cause the robot to perform a robot operation on the workpiece, the robot operation corresponding to the teaching operation.

* * * * *